United States Patent Office 2,853,463
Patented Sept. 23, 1958

2,853,463

MODIFIED ACRYLATE POLYMERS AND COMPOSITIONS CONTAINING THE SAME

Norman G. Gaylord, Westbury, N. Y., assignor to Interchemical Corporation, New York, N. Y., a corporation of Ohio No Drawing. Application May 28, 1956
Serial No. 587,492

6 Claims. (Cl. 260—45.2)

This invention relates to new polymeric materials and to coating compositions containing these new polymers. More particularly the invention relates to new addition type polymerization products that are compatible with organic solvent soluble thermosetting urea-formaldehyde and melamine-formaldehyde resins and reactive with these thermosetting aminoplast resins to form homogeneous clear films.

The new resins are copolymers of glycerol α-monoallyl ether, methacrylic acid or acrylic acid and at least one ester of acrylic or methacrylic acid with an aliphatic monohydric alcohol having 1 to 8 carbon atoms. Preferably the copolymers contain both an acrylic acid ester and methacrylic acid ester. The new resins contain 5 to 30 parts of glycerol α-mono-allyl ether and 5 to 15 parts of methacrylic acid or acrylic acid for each 100 parts of acrylate type ester. In the preferred resins the acrylate type ester will consist of 25 to 75% acrylate ester and 75 to 25% methacrylate ester, especially methyl methacrylate. Minor amounts of other copolymerizable monomers may be included in making the resins provided these other monomers do not constitute more than about 20% of the total reactants. Typical additional reactants include: acrylonitrile, bis ethylene glycol maleate, dimethyl maleate, dimethyl fumarate, and vinyl butyl ether.

The new coating compositions of the present invention comprise coating compositions whose resinous film forming component comprises organic solvent soluble heat reactive aminoplast resin and the new copolymers defined hereinabove.

In the preparation of the new copolymers of the present invention I may use, as the acrylic acid ester, methyl acrylate, ethyl acrylate, butyl acrylate, 2-ethyl hexyl acrylate or, in general, acrylic acid esters of alcohols containing 1 to 8 carbon atoms. Similarly, for the methacrylic acid ester I may use methyl methacrylate, ethyl methacrylate, butyl methacrylate, 2-ethyl hexyl methacrylate or, in general, any methacrylic acid ester of an alcohol containing 1 to 8 carbon atoms.

The glycerol mono-allyl ether used as one of the monomers in making the new copolymers has recently began a commercial product. It is readily prepared by reacting allyl chloride with the mono-sodium derivative of glycerol.

The new copolymers made in accordance with the present invention can be represented as containing the following structural units:

(A)
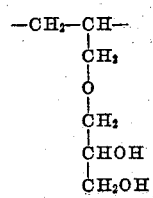

from glycerol allyl ether (B)

where R″ is H or CH$_3$ from acrylic acid or methacrylic acid and (C)

from the acrylate type ester, where R is H or CH$_3$ and R′ is an alkyl group containing 1 to 8 carbon atoms.

It will be understood that the new copolymers do not contain the structural groupings A, B and C in equal amounts but, as indicated hereinabove, in the ratio of 5 to 30 parts of A and 5 to 15 parts of B for each 100 parts of C. The acrylate ester type unit being the most prevalent, the copolymer could be generally described as a modified acrylate type of polymer.

The new polymers are made in conventional manner, for example, by mixing all of the reactants in a volatile solvent and heating with a free radical forming catalyst. Substantially 100% conversion of the monomers to soluble polymer is obtained.

The following examples will further illustrate the improved copolymers of the present invention.

Example 1

200 grams of n-butyl acrylate dissolved in 100 grams of xylene was added dropwise over a period of four hours to a solution of 4 grams of benzoyl peroxide in 100 grams of xylene while maintaining the temperature at 80° C. At the end of 12 hours, the temperature was raised to the reflux point in order to destroy excess catalyst. A sample heated to 150° C. for 30 minutes to remove volatile components indicated 100% conversion of monomer to polymer.

Example 2

50 grams of glycerol α-allyl ether (0.38 mole) was dissolved in 130 grams of xylene and placed in a 1 liter flask. A mixture of 80 grams of methyl methacrylate (0.87 mole), 120 grams of butyl acrylate (0.94 mole), 10 grams of acrylic acid (0.14 mole) and 5.2 grams of benzoyl peroxide was dissolved in 130 grams of xylene and placed in a dropping funnel and added dropwise to the solution of glycerol allyl ether over a period of four hours while maintaining the temperature at 80° C. The reaction mixture was maintained at 80° C. for an additional 15 hours after the dropwise addition was completed. Then the temperature was raised to reflux and held there for 30 minutes to destroy excess catalyst. Removal of volatile components from a sample of the product indicated 96% conversion of monomers to polymer. Volatile components were removed by heating a sample of the resin at 150° C. for 30 minutes at atmospheric pressure followed by another 30 minutes at 150° C. at 5 mm. of mercury pressure.

The resins of Examples 1 and 2 were compared by blending each of them in solution with the same quantity and type of organic solvent soluble thermosetting melamine-formaldehyde resin. Films of each solution were cast on steel panels and baked at 177° C. for 30 minutes. The baked film made from the solution containing the resin of Example 2 was a clear, cured film, having good flexibility and good surface hardness, while the film made from the solution containing the resin from Example 1 was hazy and had poor surface hardness indicating incompatibility and non-curing.

Example 3

50 grams of glycerol α-allyl ether was dissolved in 120 grams of xylene and placed in a 1-liter flask. A mixture of 100 grams of methyl methacrylate, 100 grams of ethyl hexyl acrylate, 10 grams of methacrylic acid and 4.8 grams of azo-di-isobutyronitrile was dissolved in 120 grams of xylene and added dropwise over a period of four hours to the solution of glycerol α-allyl ether. The temperature of the reaction mixture were maintained at 80° C. during addition and for another 9 hours after the addition was complete. A determination of non-volatile content indicated 92% conversion of monomers to polymer at this point. An additional 2.4 grams of azo-diisobutyronitrile was added and the mixture was heated at 80° C. for four hours and then at reflux for 30 minutes. The reaction mixture at this point contained 50% non-volatiles, indicating 100% conversion of monomers to polymers.

Example 4

40 grams of glycerol α-allyl ether was dissolved in 120 grams of xylene and placed in a 1 liter flask. A mixture of 70 grams of methyl methacrylate, 130 grams of n-butyl acrylate and 4.8 grams of benzoyl peroxide dissolved in 120 grams of xylene was added dropwise over a period of four hours. The temperature was maintained at 80° C. during the addition and for an additional 8 hours after the addition was complete. An additional 2.4 grams of benzoyl peroxide was added and the mixture was heated at 80° C. for six hours and then refluxed for 30 minutes. A determination of non-volatiles content indicated 97% conversion of monomers to polymers.

Example 5

30 grams of glycerol α-allyl ether was dissolved in 120 grams of xylene. A mixture of 120 grams of methyl methacrylate, 80 grams of 2-ethylbutyl acrylate, 10 grams of methacrylic acid and 4.8 grams of azo diisobutyronitrile, dissolved in 120 grams of xylene, is added dropwise, during a period of four hours, to the glycerol α-allyl ether solution maintained at 80° C. throughout the addition and for an additional seven hours after the addition was complete. Then an additional 2.4 grams of azodiisobutyronitrile is added and heating at 80° C. is continued for an additional six hours. The temperature is then raised to 140° C. for one-half hour to destroy excess catalyst. The resulting solution contained 50% non-volatiles indicating 100% conversion of monomers to polymers.

Example 6

A mixture of 90 grams methyl methacrylate, 110 grams of ethylbutyl acrylate, 10 grams of methacrylic acid and 4.8 grams of azo-diisobutyronitrile, dissolved in 120 grams of xylene is added dropwise to a well stirred solution of 30 grams of glycerol-allyl ether maintained at 80° C. The addition requires about 4 hours and heating at 80° C. is continued for an additional 8 hours. A determination of total non-volatiles content on the reaction mixture at this point indicates 95.6% conversion of monomers to polymers. Substantially 100% conversion can be obtained by adding another 2.4 grams of azodiisobutyronitrile catalyst to the mixture and heating at 80° C. for 6 hours. Any excess catalyst is destroyed by heating at 140° C. for 30 minutes.

Example 7

A mixture of 80 grams of methyl methacrylate, 120 grams of butyl acrylate, 10 grams of methacrylic acid and 4.6 grams of benzoyl peroxide dissolved in 115 grams of xylene is added dropwise to a well stirred solution of 20 grams of glycerol α-allyl ether dissolved in 115 grams of xylene maintained at 80° C. The addition requires about 4 hours and the temperature is maintained at 80° C. for 15 hours after the addition is complete. A non-volatile determination on the resulting solution indicated 98% conversion of monomers to polymers.

The novel compositions of the present invention contain the novel resins described and illustrated hereinabove and an organic solvent soluble thermosetting aminoplast resin, such as the urea-aldehyde resins, the melamine-aldehyde resins, the dicyandiamide-aldehyde resins, etc. The aldehyde most generally used is formaldehyde but other aldehydes, such as acetaldehyde, acrolein, and the like can be used. The aminoplast resins are readily available commercial products under such tradenames as Resimene, Uformite and Melmac.

Volatile solvents that can be used in formulating the coating compositions of the present invention include such solvents as aromatic hydrocarbons such as benzene, toluene, xylene, esters such as butyl acetate, amyl acetate, dibutyl phthalate, ethers, especially ethers of glycols or diglycols.

A distinct advantage of the compositions of the present invention is that they can be cured to insoluble film without the use of catalysts. Conventional catalysts for curing aminoplast resin can be used but since the catalyst is unnecessary it is preferred that it be omitted.

The following example in which the parts are by weight illustrate coating compositions made in accordance with the invention. The expression "Bonderite 100 steel" as employed in this example and as understood in the trade refers to a low-carbon sheet steel which has been treated by the proprietary "Bonderite" process of the Parker Rustproof Company, Detroit, Michigan. Steel coated with "Bonderite 100" has a thin adherent coating of chromium, iron, and zinc phosphates, which coating inhibits corrosion and greatly improves adhesion of paints, primers, enamels, and the like to the steel.

Example 8

A white enamel for use as an appliance finish is prepared by blending 40 parts titanium dioxide, 24 parts of organic solvent soluble thermosetting melamine-formaldehyde resin and 72 parts of a 49% solution of the resin of Example 7 in xylol and enough volatile solvent to give sprayable composition. The enamel was sprayed on primed and unprimed Bonderite 100 steel and cured by baking at 350° F. for 30 minutes to give tough glossy films having good soap and detergent resistance.

Similar enamels can be made by substituting other resins comprising copolymers of glycerol α-allyl ether, acrylic or methacrylic acid and an acrylate or methacrylate ester as described hereinabove. The ratio of thermosetting resin to copolymer resin is preferably within the range of 5 to 60 parts of thermosetting to 95 to 40 parts of copolymer. In addition to using the specific resins of this type disclosed in the above examples we have, for instance made good enamels from each of the copolymer resins prepared from the following specific types and amounts of monomers.

|     |                      | Parts |
| --- | -------------------- | ----- |
| (A) | Glycerol α-allyl ether | 15 |
|     | Methyl methacrylate    | 40 |
|     | Butyl acrylate         | 60 |
|     | Methacrylic acid       | 5 |
| (B) | Glycerol α-allyl ether | 20 |
|     | Methyl methacrylate    | 40 |
|     | Butyl acrylate         | 60 |
|     | Methacrylic acid       | 5 |
| (C) | Glycerol α-allyl ether | 25 |
|     | Methyl methacrylate    | 40 |
|     | Butyl acrylate         | 60 |
|     | Methacrylic acid       | 5 |
| (D) | Glycerol α-allyl ether | 20 |
|     | Methyl methacrylate    | 40 |
|     | Butyl acrylate         | 60 |
|     | Methacrylic acid       | 10 |

I claim:
1. Novel resins comprising the addition polymerization products of (a) 5 to 30 parts of glycerol α-mono-allyl ether, (b) 5 to 15 parts of an acrylic monomer of the group consisting of acrylic acid and methacrylic acid, and (c) 100 parts of an acrylic type ester having the formula

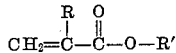

where R represents a member of the group consisting of H and CH₃ and R' is an alkyl group containing 1 to 8 carbon atoms.

2. Novel resins comprising the addition polymerization products of (a) 5 to 30 parts of glycerol α-mono-allyl ether, (b) 5 to 15 parts of methacrylic acid, and (c) 100 parts of a mixture consisting of 25 to 75% of an acrylic ester having the formula

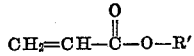

where R' is an alkyl group containing 1 to 8 carbon atoms and 75 to 25% of an acrylic ester having the formula

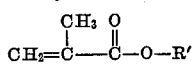

where R' is an alkyl group containing 1 to 8 carbon atoms.

3. Novel resins comprising the addition polymerization products of (a) 5 to 30 parts of glycerol α-mono-allyl ether, (b) 5 to 15 parts of methacrylic acid, and (c) 100 parts of a mixture consisting of 25 to 75% of Butyl acrylate and 75 to 25% of methyl methacrylate.

4. The method of preparing resins which includes heating (a) 5 to 30 parts of glycerol α-mono-allyl ether, (b) 5 to 15 parts of an acrylic monomer of the group consisting of acrylic acid and methacrylic acid, and (3) 100 parts of acrylic type ester having the formula

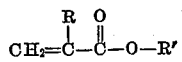

where R represents a member of the group consisting of H and CH₃ and R' is an alkyl group containing 1 to 8 carbon atoms, said heating being carried out in the presence of a free radical polymerization catalyst.

5. A composition of matter comprising 5 to 60 parts of an organic solvent soluble thermosetting aminoplast resin selected from the group consisting of urea-aldehyde resins, melamine-aldehyde resins, and dicyandiamide-aldehyde resins and 95 to 40 parts of a resin comprising the addition polymerization product of (a) 5 to 30 parts glycerol α-mono-allyl ether, (b) 5 to 15 parts of an acrylic monomer of the group consisting of acrylic acid and methacrylic acid, and (c) 100 parts of an acrylic type ester having the formula

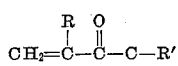

where R represents a member of the group consisting of H and CH₃ and R' is an alkyl group containing 1 to 8 carbon atoms.

6. A composition of matter comprising a volatile organic solvent solution of 5 to 60 parts of an organic solvent soluble thermosetting aminoplast resin selected from the group consisting of urea-aldehyde resins, melamine-aldehyde resins, and dicyandiamide-aldehyde resins and 95 to 40 parts of a resin comprising the addition polymerization product of (a) 5 to 30 parts glycerol α-mono-allyl ether, (b) 5 to 15 parts of an acrylic monomer of the group consisting of acrylic acid and methacrylic acid, and (c) 100 parts of an acrylic type ester having the formula

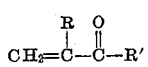

where R represents a member of the group consisting of H and CH₃ and R' is an alkyl group containing 1 to 8 carbon atoms.

References Cited in the file of this patent
UNITED STATES PATENTS
2,723,971    Cupery _____ Nov. 15, 1955
OTHER REFERENCES
Modern Plastics, September 1947, pages 128–129, 212 and 214.